Patented Nov. 21, 1933

1,936,222

UNITED STATES PATENT OFFICE 1,936,222

MANUFACTURE OF BIMETAL ARTICLES

Miner M. Austin, Waukegan, Ill., assignor to Fansteel Products Company, Inc., North Chicago, Ill., a corporation of New York No Drawing. Application November 10, 1930
Serial No. 494,699

6 Claims. (Cl. 148—26)

This invention relates in general to the manufacture of bi-metal articles and has more particular reference to fluxes for and a novel method of frabricating difficultly solderable or fusible metals and of attaching such metals to other metals.

A primary object of the invention is to so join difficultly solderable or fusible metals or to so attach two or more pieces or articles of metals, the oxides or compounds of at least one of which are refractory and resist wetting by ordinary brazing, welding or soldering compounds that an intimate or integral metallic union will be effected.

An important object of the invention is the provision of a novel method for integrally or intimately joining a hard and tough metal such as tantalum, columbium, tungsten or alloys thereof with other metals.

Another important object of the invention is to so treat such metals and alloys as nickel, silicon, refractory metals and ferrous alloys thereof and high aluminum and chromium alloys with a halogen salt or compound as to render them combinable with other metals or alloys which will provide a bond and backing for the bi-plate article as formed.

A further important object of the invention is to treat tantalum with a non-fuming flux which is chemically active with the oxides of tantalum and which is impervious to gaseous impurities whereby to adapt the tantalum for use in the formation of bi-metallic articles by means of soldering, brazing or otherwise securely and integrally attaching other metals to the tantalum.

Another important object of the invention is the provision of a halogen flux in which the refractory metal oxides are soluble for use in soldering base metals to refractory metals.

Another object of the invention is to provide an effective and simple method of joining difficultly fusible or solderable metals such as the refractory metals by soldering, brazing or welding.

Other objects and advantages will appear more fully from the following description.

Briefly the present invention contemplates the manufacture of bi-metallic articles such as plates and wire or the fabrication of difficultly fusible or solderable metals, the articles consisting of either a refractory or difficultly solderable metal or alloy fabricated by brazing, welding or soldering, or consisting partly of a refractory metal or alloy or any other metal or alloy which has heretofore been found to resist wetting by ordinary solders, such for example as chrome and high aluminum alloys, and nickel and silicon, and partly of an ordinary or base metal forming a bond and backing for the first mentioned metal or alloy, and being integrally or intimately joined therewith.

The union between the bond and backing material and the refractory metal or between two pieces of articles of a difficultly fusible or solderable metal or alloy may be effected by any suitable means for attaching one metal to another such as soldering, brazing or welding. The articles so formed combine the mechanical strength and non-corrodability of the one metal with the attractive or sightly appearance of the other.

The surface film of oxide on the refractory metals and the other hard metals and alloys already mentioned, and their affinity for gaseous impurities have heretofore precluded an integral or intimate union between such metals and the base or ordinary metals by soldering or welding where the union was made by simply heating the metals in contact with each other or rolling or hammering them while in contact.

My invention contemplates a novel method whereby two pieces or articles of a difficultly fusible or solderable metal or such a metal and another metal are so treated that the joining metal or brazing, welding or soldering compound attacks, impregnates or enters into combination with the entire surface of the difficultly fusible or solderable metal or alloy and forms an intimate metallic union between such difficultly fusible or solderable metals or between said metals and the base or ordinary metal.

As already mentioned, the refractory or difficultly solderable metals or alloys such, for example, as tantalum and alloys thereof, resist wetting by or union with ordinary soldering, brazing or welding compounds, or ordinary metals or alloys even when such metals or alloys are heated to the molten point in order to effect union with the tantalum. In order to overcome the foregoing objections whereby to provide a bi-metallic piece or article having the desirable physical, chemical and electrical properties of tantalum or the other refractory or hard metals mentioned, I treat the surface of the tantalum with a halogen flux which melts quietly and which does not decompose or fume badly at temperatures above its melting point to dissolve the surface oxides and to prevent gas absorption by the tantalum.

Such a flux as the double potassium salts of tantalum fluoride, sodium aluminum fluoride, or calcium chloride or fluor spar are very active chemically on the oxides of tantalum, columbium, chromium, aluminum and silicon.

Accordingly tantalum may be dipped in a fused bath of the halogen salt or compound contained in a nickel trough or vessel, and an ordinary solder such as silver solder or other molten metal or alloy spread or brought into contact with the surface of the tantalum, while the sheet is still beneath the molten flux. When so treated the metal or silver solder readily flows over the surface of the tantalum and makes an integral metallic union therewith thereby rendering the coated or plated tantalum capable of subsequent attachment by soldering or welding to other metals or to another piece or article of tantalum similarly treated.

Another method of utilizing these fluxes to form a bi-metallic piece or article including tantalum or any other refractory or hard metal is to prepare a fused bath of the desired backing and bonding metal such as copper, silver or gold covered with a fused layer of the flux and to lower or dip tantalum strips or wires through the fused flux and into the molten metal therebelow. It will, of course, be understood that where small surfaces are to be coated or plated the flux may be sprinkled over the surfaces and melted down with the flame.

On metals other than tantalum the salt may be sprinkled on the surface to be coated as described in the case of tantalum or it may be stuck in place with some suitable bonding material and melted by any known means.

In the fabrication of certain metals or alloys such as aluminum or alloys thereof, for example, there is some difficulty in casting due to the fact that the stock becomes oxidized beyond ordinary recovery as only a limited amount of the sprue and scrap can be added to the virgin metal. One method of improving this scrap is to melt the metal under a fluoride flux, for example calcium fluoride, sodium aluminum fluoride or a mixture thereof. These fluxes will hardly melt at the melting point of the alloy. Their melting point may be reduced, however, by the addition of potassium tantalum double fluoride. The invention, therefore, contemplates mixtures of the halogen salts or compounds to provide a flux having the desired melting point and providing the proper salt for dissolving the oxides from a fused metal bath.

It has been found that potassium tantalum double fluoride has a melting point of 700° C., while calcium fluoride or fluor spar melts at 1378° C. The other fluxes or compounds mentioned above, have melting points ranging between the melting point of potassium tantalum double fluoride and calcium fluoride, making it possible to use potassium tantalum double fluoride alone as a low melting fluoride flux or in combination with any of the other fluxes to provide a halogen compound or salt having the desired melting point.

When it is attempted to join tantalum to a backing and bond metal without the use of one of the fluxes described above the backing or bonding metal gathers in globules on the surface of the tantalum and upon cooling is found not to adhere.

The bi-metallic pieces or articles may be reduced in section as by rolling, swaging, drawing or otherwise working without changing the relative proportion of cross section of the respective metals or alloys and without disturbing the tenacious adherence of the union therebetween. It is to be understood that the invention contemplates the use of any halogen salt or compound having a solvent action on the oxides of the hard or refractory metal, as distinguished from such fluxes as borax and soda and oxygen containing fluxes which are not effective in causing tantalum or the other refractory metals mentioned above to adhere to ordinary or base metals, to one another, or to themselves.

While I have described a specific embodiment of my invention, many modifications may be made without departing from the spirit of the invention, and I do not wish to be limited to the precise details set forth but desire to avail myself of all changes within the scope of the appended claims.

I claim:
1. A flux for use in joining difficultly solderable metals which comprise potassium tantalum double fluoride.
2. A flux for use in joining difficultly solderable metals, comprising potassium tantalum double fluoride and another halogen salt having a higher melting point than said fluoride.
3. A flux comprising a fused mixture of potassium tantalum double fluoride, and a halogen salt having a higher melting point than said potassium tantalum double fluoride.
4. A flux comprising a halide having a melting point of from 700° C. to 1378° C. and potassium tantalum double fluoride.
5. A flux comprising a mixture of potassium tantalum double fluoride and another fluoride, substantially stable at temperatures above the melting point of said mixture.
6. A flux comprising a quietly meltable mixture of a halide having a melting point above 700° C. and potassium tantalum double fluoride.

MINER M. AUSTIN.